(12) United States Patent
Dashputra et al.

(10) Patent No.: US 12,439,251 B2
(45) Date of Patent: *Oct. 7, 2025

(54) AI-BASED MULTI-MODE WIRELESS ACCESS PROTOCOL (MMWAP)

(71) Applicant: Bank of America Corporation, Charlotte, NC (US)

(72) Inventors: Yash Pant Dashputra, Hyderabad (IN); Tirupathirao Madiya, Hyderabad (IN); Kiran Kumar Vemuri, Hyderabad (IN); Yellaiah Ponnameni, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 335 days.

This patent is subject to a terminal disclaimer.

(21) Appl. No.: 18/127,912

(22) Filed: Mar. 29, 2023

(65) Prior Publication Data

US 2023/0239691 A1 Jul. 27, 2023

Related U.S. Application Data

(60) Continuation of application No. 17/197,352, filed on Mar. 10, 2021, now Pat. No. 11,659,388, which is a
(Continued)

(51) Int. Cl.
*H04W 12/06* (2021.01)
*H04W 84/12* (2009.01)

(52) U.S. Cl.
CPC ............ *H04W 12/06* (2013.01); *H04W 84/12* (2013.01)

(58) Field of Classification Search
CPC ...... H04W 12/06; H04W 12/30; H04W 12/50; H04W 40/24–248; H04W 48/00–20;
(Continued)

(56) References Cited

U.S. PATENT DOCUMENTS

| 7,499,438 B2 | 3/2009 | Hinman et al. |
| 7,712,128 B2 | 5/2010 | Porozni et al. |

(Continued)

OTHER PUBLICATIONS

Cambridge Dictionary meaning of "when", 14 pages, printed on Jul. 18, 2023. Retrieved from Internet: <https://dictionary.cambridge.org/us/dictionary/english/when> (Year: 2023).*

(Continued)

*Primary Examiner* — Ronald Eisner
(74) *Attorney, Agent, or Firm* — Banner & Witcoff, Ltd.

(57) ABSTRACT

Aspects of the disclosure relate to a multi-mode wireless access protocol (MMWAP). A redirection router may receive a pre-association request, from a user communication device, and send an acknowledgment of the pre-association request. The user communication device may further transmit authorization keys associated with an application installed in the user communication device. Based on the authorization keys, the redirection router may send an authentication indication to the user communication device. The user communication device may use the redirection router to transmit and receive messages associated with the application to public networks and other private networks. The redirection router may maintain multi-mode connectivity independently with multiple user communication devices.

20 Claims, 8 Drawing Sheets

Related U.S. Application Data division of application No. 16/736,955, filed on Jan. 8, 2020, now Pat. No. 11,076,289.

(58) Field of Classification Search
CPC ............... H04W 84/105; H04W 84/12; H04W 12/00–069; G06F 21/30–46

See application file for complete search history.

(56) References Cited

U.S. PATENT DOCUMENTS

| | | | |
|---|---|---|---|
| 7,715,562 B2 | 5/2010 | Yegani et al. | |
| 7,720,464 B2 | 5/2010 | Batta | |
| 8,472,371 B1 | 6/2013 | Bari et al. | |
| 9,883,383 B1* | 1/2018 | Chintalapudi | H04B 5/79 |
| 11,659,388 B2* | 5/2023 | Dashputra | H04W 12/06 |
| | | | 455/411 |
| 2010/0248632 A1* | 9/2010 | Bhushan | H04L 63/20 |
| | | | 455/63.1 |
| 2022/0353701 A9* | 11/2022 | Elias | G01B 7/003 |

OTHER PUBLICATIONS

Oxford English Dictionary, "modulation index (n.)," Mar. 2025, https://doi.org/10.1093/OED/6062600850 (Year: 2025).*

NPL—802.11u and Hotspot 2.0 promise Wi-Fi users a cellular-like experience _ Network World, (2011), 10 pages.

NPL—RFC 5113—Network Discovery and Selection Problem, (2008), 40 pages.

Apr. 8, 2021—(US) Notice of Allowance—U.S. Appl. No. 16/736,955.

* cited by examiner

AI-BASED MULTI-MODE WIRELESS ACCESS PROTOCOL (MMWAP)

CROSS-REFERENCE TO RELATED APPLICATIONS

This application is a Continuation of U.S. patent application Ser. No. 17/197,352 filed Mar. 10, 2021, which is a divisional of U.S. patent application Ser. No. 16/736,955 filed Jan. 8, 2020, and all of the aforementioned application are herein incorporated by reference in their entireties.

TECHNICAL FIELD

Aspects described herein generally relate to computer systems, networks, and user access thereto. More specifically, aspects of this disclosure relate to user access protocols for controlling access to a wireless network.

BACKGROUND

Wireless communication networks (e.g., wireless local area networks, cellular networks, etc.) are ubiquitous and enable a user to access internet and other associated facilities using mobile communication devices. In some situations, however, such facilities may be unavailable for a variety of reasons. For example, a subscriber may be out of a service area of a service provider, internet service may be pay-walled, and/or the like. As a result, the subscriber may not always be able to access various functionalities and applications provided on mobile communication devices.

SUMMARY

Aspects of the disclosure provide flexible and customizable solutions that address and overcome technical problems associated with providing access to a communication network. In particular, one or more aspects of the disclosure relate to using user data for generation of user-specific tokens for authentication and access control.

In accordance with one or more arrangements, a communication system may comprise a redirection router and a user communication device. The redirection router may comprise at least one first processor, a first communication interface communicatively coupled to the at least one first processor, and a first memory. The user communication device may comprise at least one second processor, a second communication interface communicatively coupled to the at least one second processor, and a second memory storing. The user communication device may send, via the second communication interface, a pre-association request, where the pre-association request indicates a query for available redirection routers. The user communication device may receive, via the second communication interface and after sending the pre-association request, an acknowledgement message, where the acknowledgement message indicates presence of the redirection router. The user communication device may send, via the second communication interface to the redirection router and after receiving the acknowledgement message, authorization keys, where the authorization keys are associated with a first application installed on the user communication device. The user communication device may receive, via the second communication interface and after sending the authorization keys, an authentication indication of the authorization keys. The user communication device may send, to the redirection router and based on the authentication indication, data associated with the first application, where the user communication device blocks transmission of any data not associated with the first application. The redirection router may receive, via the first communication interface, the pre-association request. The redirection router may send, via the first communication interface and based on the pre-association request, the acknowledgement message. The redirection router may receive, via the first communication interface, the authorization keys. The redirection router may determine, based on the authorization keys, a modulation value associated with the authorization keys. The redirection router may send, via the first communication interface, the authentication indication based on a modulation value associated with the authorization keys.

In some arrangements, the communication system may further comprise a server apparatus comprising at least one third processor, a third communication interface communicatively coupled to the at least one third processor, and a third memory. The server may send, via the third communication interface to the user communication device, an executable file that, when executed by the second processor, causes the user communication device to store the second computer-readable instructions in the second memory.

In some arrangements, the user communication device may receive, via the second communication interface, the executable file, and store, in the second memory, the second computer-readable instructions.

In some arrangements, the user communication device may block operation of applications different from the first application.

In some arrangements, the user communication device may send the pre-association request if the second communication interface does not detect any beacon frames.

In some arrangements, the beacon frames may be associated with an International Institute of Electrical and Electronics Engineers (IEEE) 802.11 wireless local area network (WLAN) protocol.

In some arrangements, the user communication device may comprise a fourth communication interface. The user communication device may send the pre-association request if the user communication device is unable to access a communication network via the fourth communication interface.

In some arrangements, the first communication interface and the second communication interface are operable to transmit and receive signals in a 2.4 GHz frequency band.

In some arrangements, the modulation value may be calculated based on authorization keys and further based on location information corresponding to the redirection router and identification information of the first application.

In some arrangements, the redirection router may send the authentication indication if the modulation value is greater than or equal to 90%.

In accordance with one or more arrangements, a user communication device may comprise at least one processor, a communication interface, and memory. The user communication device may send, via the communication interface, a pre-association request, where the pre-association request indicates a query for available redirection routers. The user communication device may receive, after sending the pre-association request and from a redirection router, an acknowledgement message. The user communication device may send, to the redirection router and after receiving the acknowledgement message, authorization keys, wherein the authorization keys are associated with a first application installed on the user communication device. The user communication device may receive, after sending the authorization keys, an authentication indication of the authorization keys. The user communication device may send, to the redirection router and based on the authentication indication, data associated with the first application, where the user communication device blocks transmission of any data not associated with the first application.

In some arrangements, the user communication device may, based on receiving the authentication indication, blocking operation of applications different from the first application.

In some arrangements, the user communication device may send the pre-association request if the communication interface does not detect any beacon frames, wherein the beacon frames are associated with an International Institute of Electrical and Electronics Engineers (IEEE) 802.11 wireless local area network (WLAN) protocol.

In some arrangements, the user communication device may comprise another communication interface. The user communication device send the pre-association request if the user communication device is unable to access a communication network via the another communication interface.

In some arrangements, the user communication device may send the pre-association request and the authorization keys in a 2.4 GHz frequency band.

In some arrangements, sending the authorization keys may further comprise sending identification information corresponding to the first application.

In accordance with one or more arrangements, an apparatus may comprise at least one processor, a communication interface communicatively coupled to the at least one processor, and a memory. The apparatus may receive, via the communication interface and from a user communication device, a pre-association request, where the pre-association request indicates a query for available redirection routers. The apparatus may send, based on the pre-association request and to the user communication device, an acknowledgement message. The apparatus may receive, from the user communication device, authorization keys, where the authorization keys are associated with a first application installed on the user communication device. The apparatus may determine, based on the authorization keys, a modulation value associated with the authorization keys. The apparatus may send, to the user communication device, an authentication indication based on a modulation value associated with the authorization keys. The apparatus may receive, from the redirection router, data associated with the first application, wherein the redirection router blocks transmission of any data not associated with the first application.

In some arrangements, the apparatus may receive, from the user communication device, an application association request, where the application association request comprises an indication of the first application. The apparatus may send, to the user communication device and based on the application association request, an association response message indicating that the user communication device may send, to the apparatus, messages associated with the first application.

In some arrangements, the apparatus may send the acknowledgment message and the authentication indication in a 2.4 GHz frequency band.

In some arrangements, the apparatus may determine the modulation value based on authorization keys and further based on location information corresponding to the apparatus. The apparatus may send the authentication indication if the modulation value is greater than or equal to 90%.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
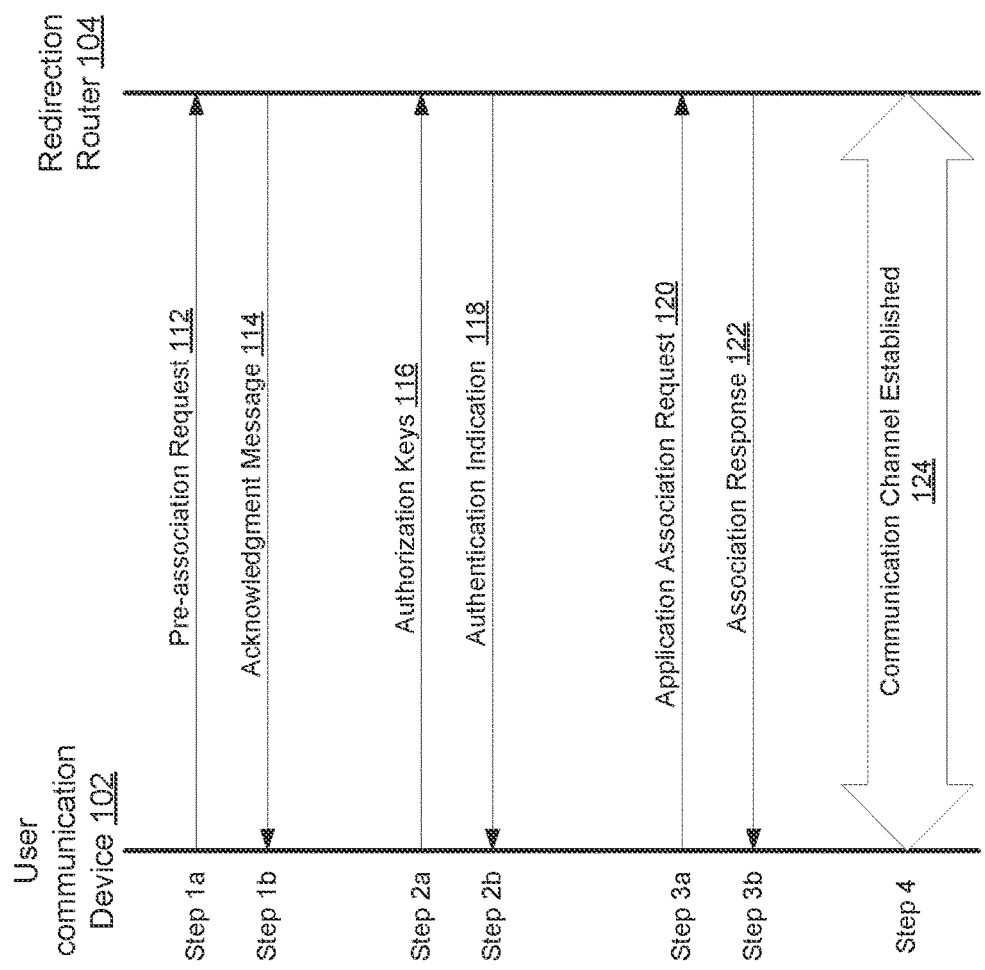
FIG. 1 illustrates example operation of a multi-mode wireless access protocol (MMWAP), in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to a multi-mode wireless access protocol (MMWAP). A redirection router may receive a pre-association request, from a user communication device, and send an acknowledgment of the pre-association request. The user communication device may further transmit authorization keys associated with an application installed in the user communication device. Based on the authorization keys, the redirection router may send an authentication indication to the user communication device. The user communication device may use the redirection router to transmit and receive messages associated with the application to public networks and other private networks. The redirection router may maintain multi-mode connectivity independently with multiple user communication devices.

Enterprise organizations (e.g., service providers, corporate entities, government agencies, and/or the like) often provide, to consumers, downloadable applications to enhance their products and services. The applications may be installed on user communication devices (e.g., smartphones, tablet computers, laptop computers, and/or the like). Use of such applications may require a connection to the internet to communicate with various servers (e.g., servers associated with the applications). However, in many cases, an internet connection may not always be available. A subscriber of a cellular service, for example, may have run out of provided data or may be in an area that is not served by the cellular service provider. In many scenarios, cellular service is not available or sporadic (e.g., inside buildings).

Other options such wireless local area networks (WLAN) services may be unavailable in many circumstances. For example, a user may not have necessary credentials to connect to a WLAN network, or there may be no nearby routers broadcasting a WLAN signal.

Enterprise organizations may improve user experience and convenience by provision of "hotspots" that may service data related to specific applications associated with the enterprise organizations. The hotspots may be located at physical locations associated with the organization and may be served by one or more redirection routers. A consumer associated with the organization may use the hotspots, for example, to access and use the applications. The redirection router may establish a communication link between the application and a server associated with the application. The hotspots may be served by redirection routers that may be configured to reject connections and data from non-consumers and applications that are not maintained by the organization. A banking center, for example, may be served by a redirection router that is configured to reject connections and data from non-consumers and applications that are not maintained by the bank. This may avoid unnecessary usage of bandwidth, improve provision of services to consumers, and enhance network security.

Establishing communication between a user communication device and a redirection router may be in a manner that is transparent to the consumer, thereby reducing consumer burden to remember authentication credentials for multiple different service providers. Redirection routers may establish and/or maintain separate modes of connectivity with different user communication devices. The different types of modes may be banal with existing multi-mode wireless access protocols.

FIG. 1 illustrates example procedure 100 of a multi-mode wireless access protocol (MMWAP), in accordance with one or more example embodiments. A user communication device 102 may correspond to a mobile computing device (e.g., a cellphone, a tablet computer, a laptop, and/or the like). A redirection router 104 may be associated with a hotspot and may function as a gateway for communications between the user communication device 102 and other networks (e.g., private networks, public networks). The redirection router 104 may be associated with an application operating on the user communication device 102. For example, the redirection router 104 may be connected to a server associated with the application and/or may be connected to the internet, and may be configured to transmit data and/or receive data associated with the application. The application may be further associated with basic input/output system (BIOS) instructions that enable transmission of messages and processing of received messages as described with reference to FIG. 1. A plurality of applications may operate on the user communication device 102.

At step 1a, the user communication device 102 may transmit a pre-association request (also referred to herein as an inquisition request) 112. The user communication device 102 may transmit the pre-association request 112 to search for available redirection routers in a communication range of the user communication device. The pre-association request 112 may indicate a query for available redirection routers. In an arrangement, the user communication device 102 may check for available wireless communication networks prior to transmission of the pre-association request 112. The user communication device 102 may transmit the pre-association request 112, for example, if the user communication device has data, associated with the application, to transmit and/or receive.

The user communication device 102 may check for available International Institute of Electrical and Electronics Engineers (IEEE) 802.11 WLAN networks prior to transmission of the pre-association request 112. The user communication device 102 may check for IEEE 802.11 WLAN beacon signals. The user communication device 102 may check if the user communication device may access an available WLAN network using credentials stored in a memory of the user communication device 102. The user communication device 102 may check for a cellular signal (e.g., corresponding to 3G/4G/5G cellular network) and may further check if the user communication device 102 may authenticate itself to a cellular network. In an arrangement, the user communication device 102 may transmit the pre-association request 112 if the user communication device 102 is unable to detect a beacon/communication network, and/or is unable to access/authenticate itself to a communication network. The redirection router 104 may receive the pre-association request. In an arrangement, the user communication device 102 may transmit the pre-associations request 112 without receiving and/or processing any beacon signal (e.g., an IEEE 802.11 WLAN beacon frame). For example, the pre-association request 112 may not be based on a beacon signal.

At step 1b, the redirection router 104 may transmit an acknowledgment message 114. The redirection router 104 may transmit the acknowledgment message after or in response to receiving the pre-association request 102. The acknowledgment message 114 may comprise an indication (e.g., identification) of the redirection router 104. In an arrangement, the acknowledgement message 114 may comprise a wireless alias name of a hotspot served by the redirection router 104. In an arrangement, the redirection router 104 may not transmit any beacon signals (e.g., IEEE 802.11 WLAN beacon frames), and instead may transmit the acknowledgment message 114 in response to receiving a pre-association request.

At step 2a, the user communication device 102 may send authorization keys 116 to the redirection router 104. The user communication device 102 may send the authorization keys 116, for example, after or in response to receiving the acknowledgment message 116. The authorization keys 116 may be associated with the application installed on the user communication device 102. The user communication device 102 may transmit the authorization keys 116, for example, if the redirection router 104 is associated with the application installed on the user communication device 102. The user communication device 102 may use the wireless alias name in the acknowledgment message 114 to determine if the redirection router 104 is associated with the application installed on the user communication device 102. For example, the user communication device 102 may have a list of one or more wireless alias names associated with the application and may use the list to determine if the redirection router 104 is associated with the application installed on the user communication device 102. In one example, the user communication device 102 may further transmit location information of the user communication device 102 (e.g., address, global navigation satellite system coordinates, and/or the like) and/or an indication (e.g., identity) of the application.

The redirection router 104 may determine a modulation value based on one or more parameters (e.g., the authorization keys 116, the location information, the indication of the application, signal strength of messages received from the user communication device 102, and/or the like). The redirection router 104 may use, in one example, one or both of arithmetic and/or logical operations to determine the modulation value. The modulation value may correspond to, for example, a confidence value associated with a determination, at the redirection router, of whether an application on the user communication device 102 is pre-associated with the redirection router 104. The redirection router 104 may determine, based on the calculated modulation value, if the user communication device may be allowed access to the redirection router 104. As further described herein, the redirection router 104 may determine that the user communication device 102 is authorized to use the redirection router 104 (e.g., to connect to a server) if the determined modulation value is above a certain threshold value.

In an arrangement, machine learning techniques may be used to train the redirection router 104 to determine whether an application on the user communication device 102 is the application that is pre-associated with the redirection router 104. For example, the redirection router 104 may be trained using different data and hyperparameters (e.g., authorization keys, location information, indication of an application, signal strength, and/or the like) along with indications of whether or not the training parameters correspond to the application associated with the redirection router 104. The redirection router 104 may use a machine learning model based on the training parameters and use the model to accept or reject connections from user communication devices. The redirection router 104 may continually update the model based on received parameters from multiple user communication devices. The redirection router 104 may use, for example, linear regression techniques and other techniques as described in FIG. 5 below, to determine and/or update the model.

The redirection router 104 may determine, based on the determined modulation value and the baseline modulation value, if the user communication device 102 is authorized to use the redirection router 104 to transmit/receive messages associated with the application. The redirection router 104 may determine the user communication device 102 is authorized to use the redirection router 104 if the determined modulation value is within an acceptable margin of the baseline modulation value. The redirection router 104 may transmit the authentication indication 118, for example, if the determined modulation value is within 90% of the baseline modulation value.

At step 2b, the redirection router 104 may transmit, based on the modulation value, an authentication indication 118. The redirection router 104 may transmit the authentication indication 118 if the redirection router determines that the user communication device 102 is authorized to use the redirection router 104. The redirection router 104 may transmit the authentication indication 118 if the determined modulation value is within an acceptable threshold. The redirection router 104 may transmit the authentication indication 118, for example, if the determined modulation value is greater than or equal to 90%. The authentication indication 118 may indicate that the user communication device 102 is allowed access to the redirection router 104 (e.g., to connect to a server). The redirection router 104 may refrain from transmitting the authentication indication 118, for example, is less than an acceptable threshold (e.g., less than 90%).

At step 3a, the user communication device 102 may transmit an application association request 120 based on receiving the authentication indication 118. The application association request 120 may indicate a request to allow an application (e.g., operating on the user communication device 102) to transmit to and/or receive messages from a network via the redirection router 104. The application association request 120 may, for example, comprise an indication of the application.

The redirection router 104 may determine if the indication of the application in the application association request 120 corresponds to the application that the redirection router 104 is associated with. At step 3b, the redirection router 104 may transmit an association response message 122 if the indication of the application in the application association request 120 corresponds to the application that the redirection router 104 is associated with. The redirection router 104 may refrain from transmitting an association response message 122 if an indication of an application in the application association request 120 does not correspond to the application that the redirection router 104 is associated with.

At step 4, the user communication device 102 and the redirection router 104 may exchange one or more messages and establish a communication channel. The user communication device 102 and the redirection router may use, for example, one or more messages corresponding to an IEEE 802.11u communication protocol to establish a communication channel. The user communication device 102 and the redirection router 104 may exchange one or more messages associated with the application over the established communication channel. The redirection router 104 may communicate with an internet web server associated with the application. The redirection router 104 may forward messages associated with the application, from the user communication device 102, to the internet web server. The redirection router 104 may receive messages, from the internet web server, and forward the messages to the user communication device 102. When the communication channel has been established between the user communication device 102 and the redirection router 104, then the user communication device 102 (and/or the redirection router 104) may block any future transmission of any data that is not associated with the application. For example, the user communication device 102 may block operations of any other applications on the user communication device 102 so as to prevent security breaches originating from other applications installed on the user communication device 102.

The BIOS instructions, when executed by a processor in the user communication device 102, cause the user communication device to execute various operations described above with reference to the procedure 100. The BIOS instructions may be stored, for example, in a BIOS memory of the user communication device 102. The BIOS instructions may enable the user communication device 102 to, for example, generate and transmit the pre-association request 112, the authorization keys 116, and the application association request 120. as well as receive and process the acknowledgment message 114, the authentication indication 118, and the association response 122.

The user communication device 102 may check for available IEEE 802.11 WLAN networks prior to executing the BIOS instructions. The user communication device 102 may check for IEEE 802.11 WLAN beacon signals. The user communication device 102 may check if the user communication device may access an available WLAN network using credentials stored in a memory of the user communication device 102. The user communication device 102 may check for a cellular signal (e.g., corresponding to 3G/4G/5G cellular network) and may further check if the user communication device 102 may authenticate itself to a cellular network. The processor may execute the BIOS instructions based on a determination that the user communication device 102 is unable to detect a beacon/communication network, and/or is unable to access/authenticate itself to a communication network.

If at any instance during the procedure 100, the user communication device 102 detects a beacon/communication network, and/or is able to access/authenticate itself to a communication network the user communication device 102 may exit the procedure 100 or drop a connection to the redirection router 104. The user communication device 102 may attempt to connect to the available communication network and attempt to communicate over the communication network. In one example, the user communication device may send a pre-association request if no beacons, e.g., beacon frames, are detected for a predetermined duration of time. Beacon frames may sometimes indicate the presence of available wireless networks.

A communication network executing the procedure 100 may be configured with for operation in a one or more frequency bands and/or channels, and may use one or more transmission data rates. Various transmissions described above with reference to the procedure 100 may use, for example, a 2.4 GHz frequency band. The transmissions may be, for example, in a 20 MHz channel in the 2.4 GHz frequency band. A data rate for transmission may be 20 Mbps. The frequency band, channel width, and data rate described herein are merely examples, and in other embodiments different frequency bands, channel widths, and data rates may be used.

Using the procedure 100, the user communication device 102 may connect to a server (e.g., a server associated with the application) in an automated manner without any user input. Further, if a user communication device 102 does not have operable cellular or WLAN connection but a user associated with the user communication device 102 needs to operate the application (e.g., to make a transaction), the user simply needs to proceed to a hotspot location. The user communication device 102 and the redirection router 104 may seamlessly establish a connection and enable the user to operate the application and communicate with the server. This enables the application to operate and communicate while the user communication device 102 is otherwise offline.

Figure 2A:
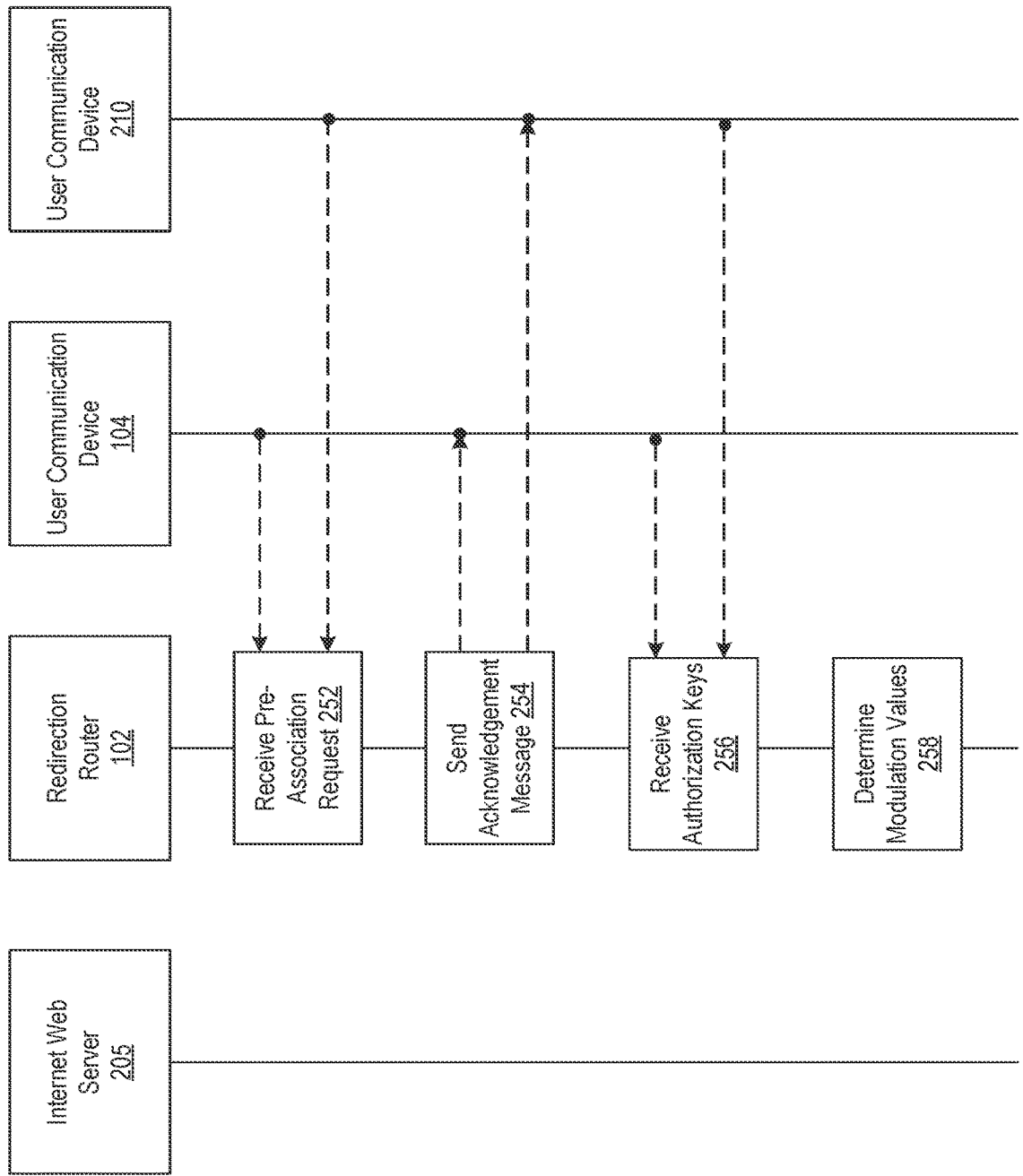
FIGS. 2A and 2B depict an illustrative event sequence for a MMWAP, in accordance with one or more example arrangements.
Figure 2B:
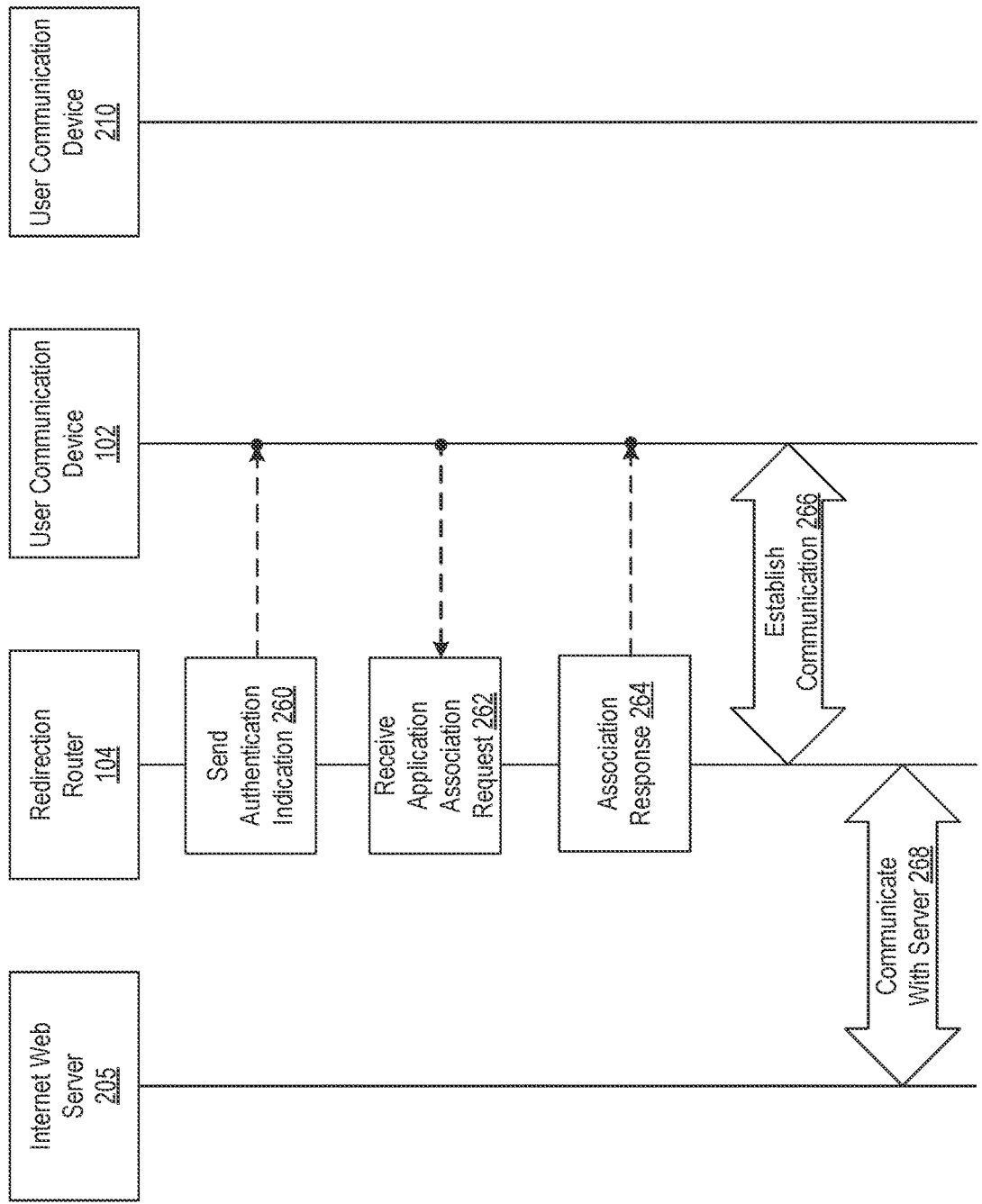

FIGS. 2A and 2B depict an illustrative event sequence for a MMWAP, in accordance with one or more example arrangements. A computing environment may comprise the redirection router 104 and the user communication device 102 and a user communication device 210. The computing environment may further comprise an internet web server 205 associated with the application and another user communication device 210.

At step 252, the user communication devices 102 and 210 may send corresponding pre-association requests. The redirection router 104 may detect/receive the corresponding pre-association requests. Each of the pre-association requests may indicate a query for available redirection routers.

At step 254, the redirection router 104 may transmit acknowledgment messages to the user communication devices 102 and 210. The acknowledgment messages may indicate a presence of the redirection router 104. The user communication devices 102 and 210 may receive corresponding acknowledgment messages and determine the presence of the redirection router in a communication range of the user communication devices 102 and 210.

At step 256, the redirection router 104 may receive authorization keys from the user communication devices 102 and 210. The redirection router 104 may receive first authorization keys from the user communication device 102 and second authorization keys from the user communication device 210. The first authorization keys may be associated with a first application operating on the user communication device 102. The second authorization keys may be associated with a second application operating on the user communication device 102.

At step 258, the redirection router 104 may determine a first modulation value based on the first authorization keys, and a second modulation value based on the second authorization keys. The redirection router 104 may further use other information (e.g., location information, application identification information, signal strength information, and/or the like), as described above with reference to FIG. 1, to determine the first and the second modulation values. In an arrangement, the redirection router 104 may be associated with the first application. The redirection router 104 may determine that the first modulation value is above an acceptable threshold and the second modulation value is below an acceptable threshold. Based on this, the redirection router 104 may determine that the first application operating on the user communication device 102 is allowed to communicate with the redirection router 104, and the second application operating on the user communication device 210 is not allowed to communicate with the redirection router 104.

At step 260, the redirection router 104 may send an authentication indication to the user communication device 104. The authentication indication may indicate that the user communication device 104 is allowed to use/communicate with the redirection router. The redirection router 104 may refrain from sending an authentication indication to the user communication device 210 based on the determination that the second modulation value is below an acceptable margin of the baseline modulation value.

At step 262, the redirection router 104 may receive the user communication device 102 may transmit an application association request based on receiving the authentication indication. The application association request may indicate a request to allow an application (e.g., operating on the user communication device 102) to transmit to and/or receive messages from a network via the redirection router 104. The application association request may, for example, comprise an indication of the first application.

The redirection router 104 may determine if the indication of the first application in the application association request corresponds to the first application that the redirection router is associated with. At step 264, the redirection router 104 may transmit an association response message if the indication of the first application in the application association request corresponds to the application that the redirection router is associated with. The redirection router 104 may refrain from transmitting an association response message if an indication of an application in the application association request does not correspond to the application that the redirection router 104 is associated with.

At step 266, the user communication device 102 and the redirection router 104 may exchange one or more messages and establish a communication channel. The user communication device 102 and the redirection router may use, for example, one or more messages corresponding to an IEEE 802.11u communication protocol to establish a communication channel. The user communication device 102 and the redirection router 104 may exchange one or more messages associated with the first application over the established communication channel. At step 268, the redirection router 104 may communicate with the internet web server 205. The internet web server 205 may be associated with the first application. The user communication device 102 and/or the redirection router 104 may block transmission of any data that is not associated with the first application. The user communication device 102 may preventing operations of any other application different from the first application.

Instructions for a processor at the user communication device 104 and/or a processor at the user communication device 210 to participate in the event sequence of FIGS. 2A and 2B may be stored in corresponding BIOS memories. Instructions stored in a BIOS memory of the user communication device 104 may be associated with the first application and instructions stored in a BIOS memory of the user communication device 210 may be associated with the second application. As described above with reference to FIG. 1, a processor may determine to execute the BIOS instructions based on a determination that a user communication device is unable to detect a beacon/communication network, and/or is unable to access/authenticate itself to a communication network. BIOS instructions may be installed during the installation of the corresponding applications.

While FIGS. 2A and 2B illustrate the redirection router 104 establishing a connectivity with a single user communication device (e.g., the user communication device 102), in other arrangements, the redirection router 104 establishing connectivity with a plurality of user communication devices. The redirection router 104 may maintain separate connectivity modes with each of the plurality of communication devices.

In an arrangement, the redirection router 104 may be associated with a plurality of applications (e.g., the first application and a third application). In one such arrangement, the redirection router 104 may establish communication with the user communication device 104 and exchange one or more messages associated with the first application, and may establish communication with another user communication device (not shown) and exchange one or more messages associated with a third application. In an arrangement, the redirection router 104 may simultaneously maintain communication with the user communication device 104 and the another user communication device.

The event sequence described with reference to FIGS. 2A and 2B enables the user communication device 102 to establish a communication channel in an automated manner without necessitating any user input. The event sequence enables the user communication device to establish a connection to the redirection router 104 and the internet web server 205, and enable a dedicated communication channel for the first application. The dedicated communication channel reduces potential risk of malware and security attacks. Further, unnecessary browsing and streaming of data not related to the first application is avoided by blocking transmission of any data that is not associated with the first application and/or preventing operations of any other application different from the first application. This may improve service quality and reliability for the authorized users.

Figure 3:
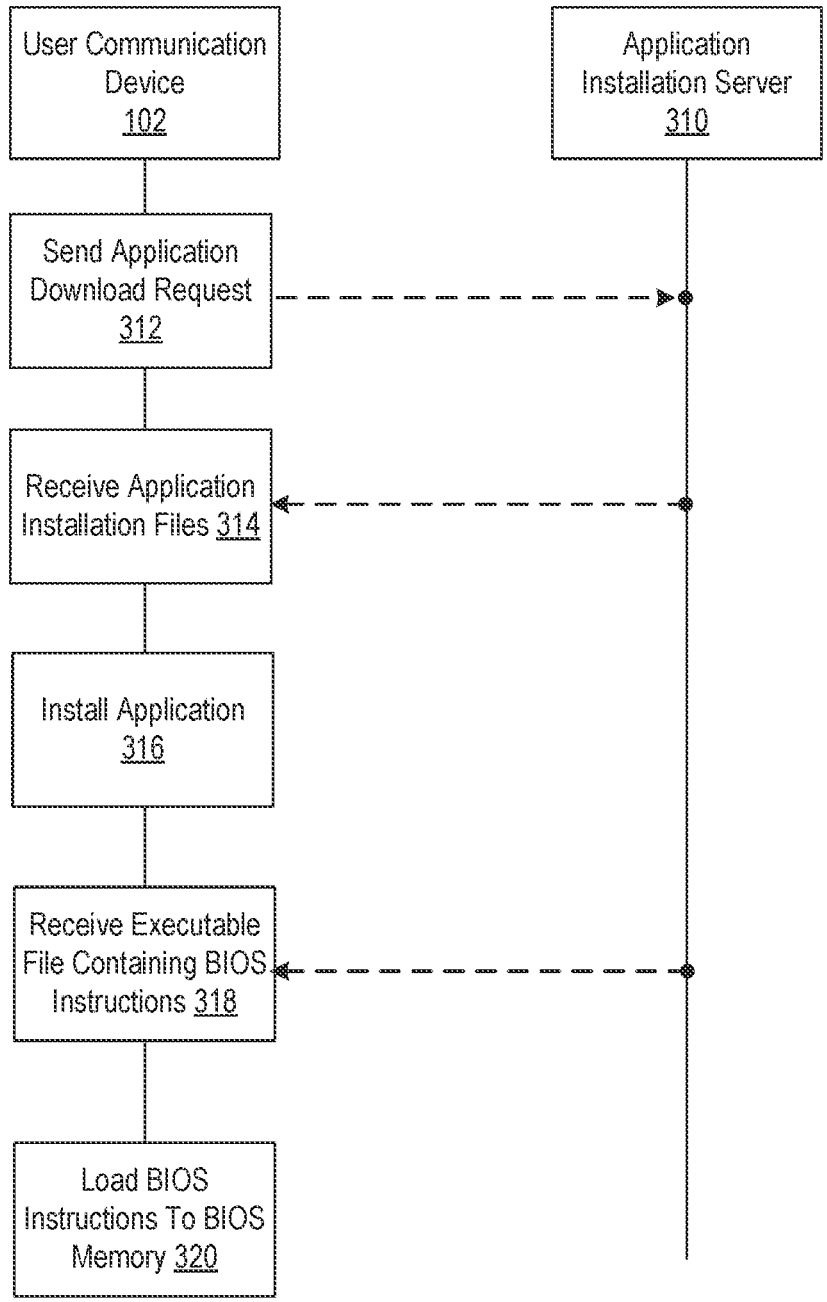
FIG. 3 depicts an illustrative event sequence for installation of basic input-output systems (BIOS) instructions associated with an application, in accordance with one or more example embodiments.

FIG. 3 depicts an illustrative event sequence for installation of BIOS instructions associated with an application, in accordance with one or more example embodiments. At step 312, the user communication device 102 may send an application download request, to an application installation server 310, for an application. The application installation server 310 may be associated with on online repository of downloadable applications. At step 314, the user communication device 102 may receive, from the application installation server 310, one or more application installation files. The one or more application installation files may be an executable file corresponding to the application. At step 316, a processor in the user communication device 102 may execute the executable file and install the application to a memory of the user communication device 102. At step 318, the user communication device 102 may receive, from the application installation server 310, another executable file with the BIOS instructions. At step 316, a processor in the user communication device 102 may execute the another executable file and load the BIOS instructions to the BIOS memory. In an arrangement, the user communication device may receive only a single executable file that, when executed by the processor, installs the application as well as the BIOS instructions.

Figure 4A:
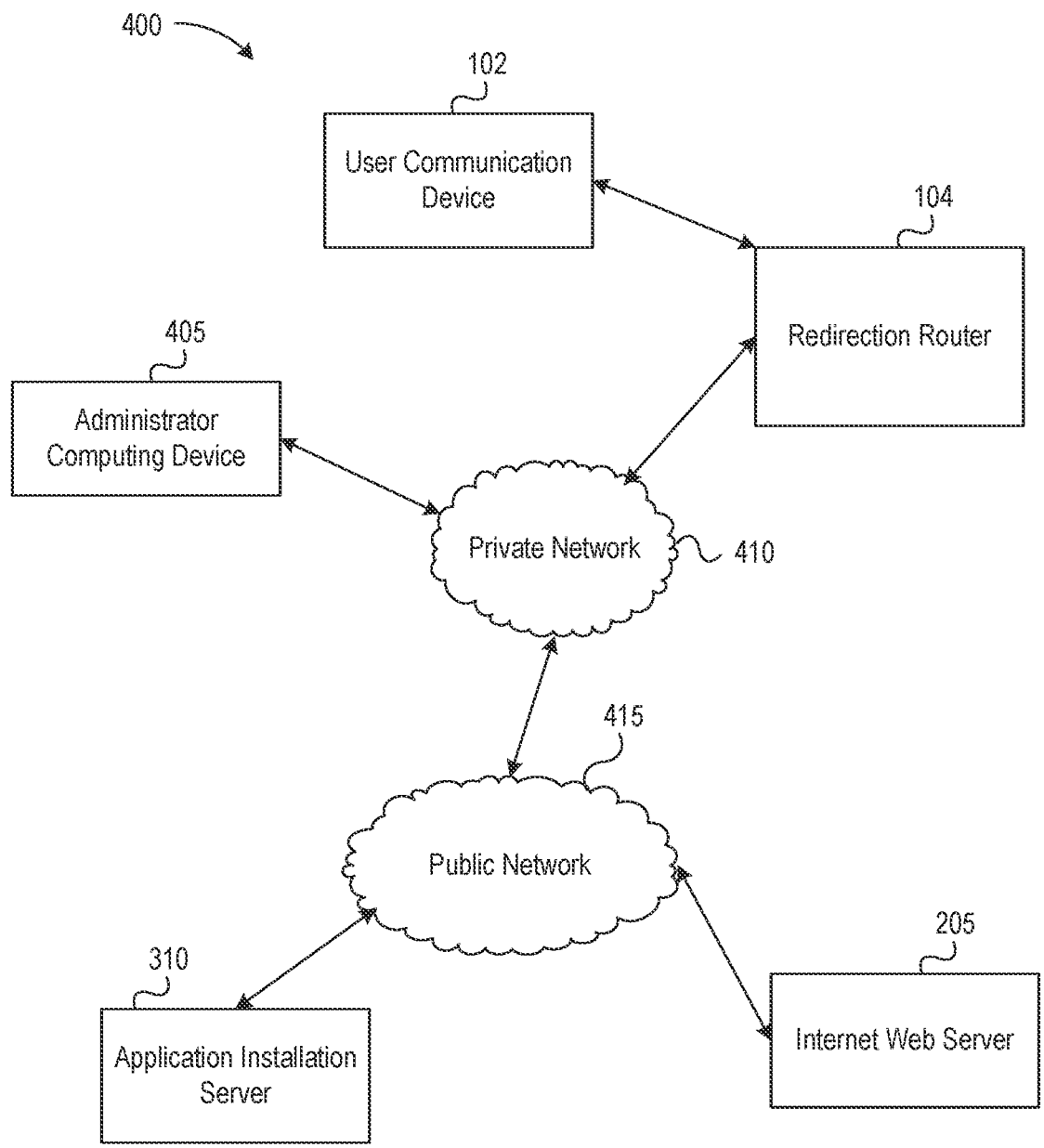
FIGS. 4A, 4B, and 4C depict an illustrative computing environment for MMWAP, in accordance with one or more example arrangements.
Figure 4B:
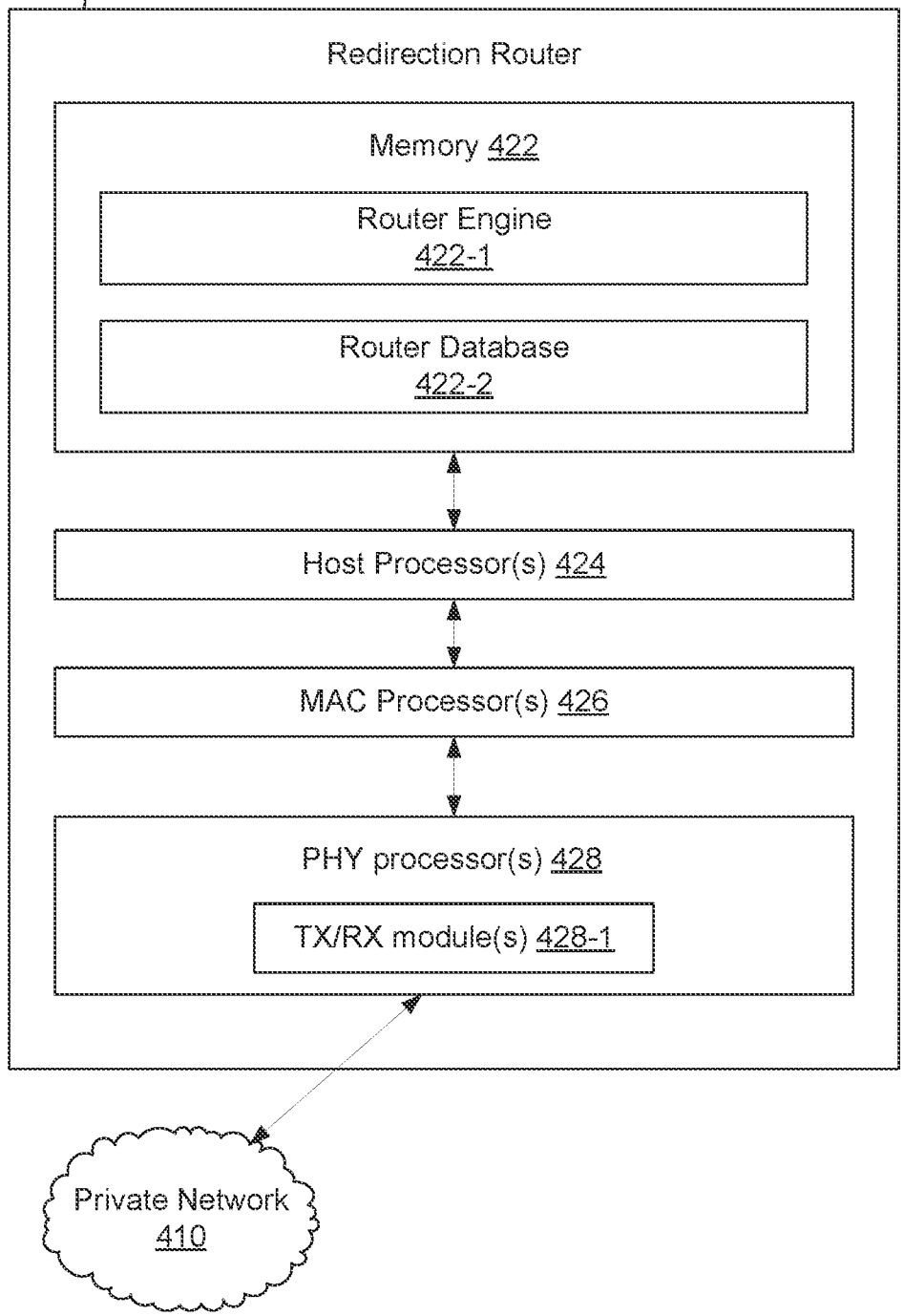
Figure 4C:
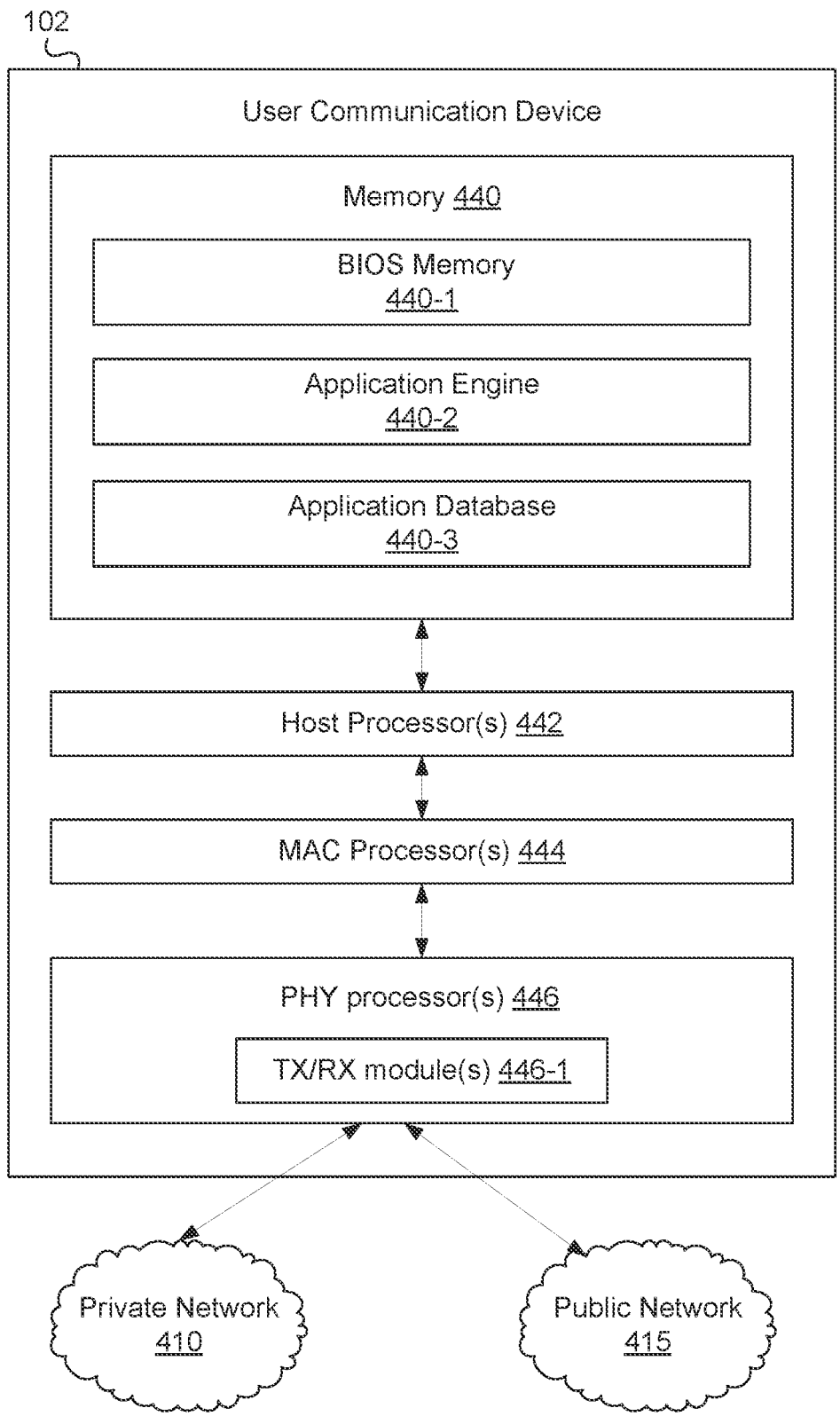

FIGS. 4A, 4B, and 4C depict an illustrative computing environment for MMWAP, in accordance with one or more example arrangements. Referring to FIG. 4A, a computing environment 400 may comprise one or more devices (e.g., computer systems, communication devices). The computing environment 400 may comprise, for example, the user communication devices 102, the redirection router 104, the internet web server 210, the application installation server 310, an administrator computing device 405, and/or the like. The computing environment 400 may comprise a private network 410 (which may, e.g., interconnect the user communication device 102, the redirection router 104, and the administrator computing device 405) and a public network 415. The private network 410 may use wired and/or wireless communication protocols. The private network 410 may, for example, comprise a local area network (LAN), a wide area network (WAN), an IEEE Standard 802.11a/b/g/n/ac/ax "Wi-Fi" network, a peer-to-peer network, and/or the like. The user communication device 102 may communicate over the private network 410 and/or the public network 415 by establishing a communication channel with the redirection router 104 (e.g., using the procedure 100).

In an arrangement, the private network 410 may correspond to a network associated with an enterprise organization. A user in a context of the computing environment 400 may, for example, be an associated user (e.g., a client, customer) of the enterprise organization. An enterprise organization may correspond to any government institution, private institution, educational institution, financial institution, health services provider, retailer, and/or the like. Users may operate one or more devices in the computing environment 400 to send messages to and/or receive messages from one or more other devices connected to the computing environment 400.

The user communication device 102 may be a personal computing device (e.g., laptop computing devices, smartphones, tablets, wearable devices, etc.). The user communication device 102 may be configured with an operating system (IOS, Android, etc.). An application associated with the enterprise organization may be installed on the user communication device 102. Users may use the application to access account/membership information (e.g., account balance information, account statements, recent transaction history information, etc.), make transactions (e.g., banking transactions, online purchases, etc.), and/or the like. The user communication device 102 may use a communication protocol (e.g., a "Wi-Fi" protocol, a cellular protocol, a LAN network, a WAN network, and/or the like) to connect to the one or more devices in the computing environment 400, and/or to the private network 410 and/or to the public network 415. The user communication device 102, for example, may use a Wi-Fi communication protocol to establish a connection with an access point associated with the private network 410. The user communication device 102, for example, may use a 5G cellular protocol to establish a connection with a picocell or a femtocell associated with a 5G service provider, and connect to the public network 415.

The internet web server 205 may be associated with the application installed on the user communication device 102. In an arrangement, the internet web server 205 may be configured to provide an online service portal that may enable users to access account/membership information, make transactions, etc. In an arrangement, the internet web server 205 may be configured to provide a mobile portal that is accessible to users on mobile computing devices (e.g., the user communication device 102) using the application. While FIG. 4 illustrates the internet web server 205 being connected to the private network 410 via the public network 415, in another arrangement, the internet web server 410 is directly connected to private network 410.

The application installation server 205 may store executable files associated with the application. The executable files may correspond to application installation files and/or BIOS instructions. The executable files may be transmitted to the user communication device 102 based on a request from the user communication device 102.

The administrator computing device 405 may be a personal computing device (e.g., desktop computer, laptop computer) or mobile computing device (e.g., smartphone, tablet). The administrator computing device 120 may be linked to and/or operated by an administrative user (e.g., a network administrator of an enterprise organization). The administrator computing device 120 may be configured to control operation of the redirection router 104, the internet web server 205, and/or the private network 410.

In various arrangements, the illustrative event sequences described with reference to FIGS. 2A, 2B, and 3 may occur in the computing environment 400 or in a computing environment different from the computing environment 400. In various arrangements described herein, the administrator computing device 405, the user communication device 102, the redirection router 104 and/or other device(s) in the computing environment 400 may use one or more algorithms that are based on one or more steps described with reference to FIGS. 2A, B, and 3 to implement the MMWAP.

The user communication devices 102, the redirection router 104, the internet web server 210, the application installation server 310, the administrator computing device 405, and/or one or more other systems/devices in the computing environment 400 may be any type of computing device capable of receiving input via a user interface, and communicating the received input to one or more other computing devices. The user communication devices 102, the redirection router 104, the internet web server 210, the application installation server 310, the administrator computing device 405, and/or other systems/devices in the computing environment 400 may be and/or include, in some instances, server computers, desktop computers, laptop computers, tablet computers, smart phones, wearable devices, or the like that may be comprised of one or more processors, memories, communication interfaces, storage drives, and/or other components. Any and/or all of user communication devices 102, the redirection router 104, the internet web server 210, the application installation server 310, the administrator computing device 405, and/or other systems/devices in the computing environment 400 may be, in some instances, special-purpose computing devices configured to perform specific functions.

Referring to FIG. 4B, the redirection router 104 may comprise one or more of memory 422, host processor(s) 424, medium access control (MAC) processor(s) 426, physical layer (PHY) processor(s) 428, TX/RX module(s) 428-1, or the like. One or more data buses may interconnect host processor(s) 424, memory 422, MAC processor(s) 426, PHY processor(s) 428, and/or TX/RX module(s) 428-1. The redirection router 104 may be implemented using one or more integrated circuits (ICs), software, or a combination thereof, configured to operate as discussed below. The host processor(s) 424, the MAC processor(s) 426, and the PHY processor(s) 428 may be implemented, at least partially, on a single IC or multiple ICs. Memory 422 may be any memory such as a random-access memory (RAM), a read-only memory (ROM), a flash memory, or any other electronically readable memory, or the like.

Messages and/or information transmitted from and/or received at devices/systems in the computing environment 400 may be encoded in one or more MAC data units and/or PHY data units. The MAC processor(s) 426 and/or the PHY processor(s) 428 of the redirection router 104 are configured to generate data units, and process received data units, that conform to any suitable wired and/or wireless communication protocol. For example, the MAC processor(s) 426 may be configured to implement MAC layer functions, and the PHY processor(s) 428 may be configured to implement PHY layer functions corresponding to the communication protocol. The MAC processor(s) 426 may, for example, generate MAC data units (e.g., MAC protocol data units (MPDUs)), and forward the MAC data units to the PHY processor(s) 428. The PHY processor(s) 428 may, for example, generate PHY data units (e.g., PHY protocol data units (PPDUs)) based on the MAC layer data units. The generated PHY data units may be transmitted via the TX/RX module(s) 428-1 over the private network 410 and/or the public network 415. Similarly, the PHY processor(s) 428 may receive PHY data units from the TX/RX module(s) 428-1, extract MAC layer data units encapsulated within the PHY data units, and forward the extracted MAC data units to the MAC processor(s). The MAC processor(s) 426 may then process the MAC data units as forwarded by the PHY processor(s) 428.

One or more processors (e.g., the host processor(s) 424, the MAC processor(s) 426, the PHY processor(s) 428, and/or the like) of the redirection router 104 are configured to execute machine readable instructions stored in memory 422. Memory 422 may comprise (i) one or more program modules/engines having instructions that when executed by the one or more processors cause the redirection router 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the redirection router 104 and/or by different computing devices that may form and/or otherwise make up the redirection router 104. For example, the memory 422 may have, store, and/or comprise a router engine 422-1, and a router database 422-2. The router engine 422-1 may have instructions that direct and/or cause the redirection router 104 to perform the one or more operations described herein. The router engine 422-1 may have instructions that, for example, direct the redirection router 104 to determine modulation values and send authentication indications. The router database 422-2 may comprise settings associated with a communication channel that the redirection router 104 may establish. The redirection router may be connected to one or more user communication devices and the router database 422-2 may store identities of the user communication devices. The router database 422-2 may be associated with one or more applications and the redirection router 104 may store a list of the one or more applications. The router database 422-2 may store parameters associated with a machine learning model that is determined based on training parameters.

Referring to FIG. 4C, the user communication device 102 may comprise one or more of host processor(s) 442, memory 440, MAC processor(s) 143, PHY processor(s) 145, TX/RX module(s) 446-1, or the like. One or more data buses may interconnect the host processor(s) 442, the memory 440, the MAC processor(s) 442, the PHY processor(s) 446, and/or the TX/RX module(s) 446-1. The user communication device 102 may be implemented using one or more ICs, software, or a combination thereof, configured to operate as discussed below. The host processor(s) 442, the MAC processor(s) 442, and the PHY processor(s) 109 may be implemented, at least partially, on a single IC or multiple ICs. Memory 440 may comprise RAM, ROM, flash memory, and/or any other electronically readable memory. Messages and/or information transmitted from and/or received at devices/systems in the computing environment 100 may be encoded in one or more MAC data units and/or PHY data units. The TX/RX module(s) 446-1 may transmit and/or receive messages over the private network 410 and/or the public network 415.

One or more processors (e.g., the host processor(s) 442, the MAC processor(s) 442, the PHY processor(s) 446, and/or the like) of the user communication device 102 may be configured to execute machine readable instructions stored in memory 440. Memory 440 may comprise (i) one or more program modules/engines having instructions that when executed by the one or more processors cause the user communication device 102 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the user communication device 102. For example, memory 440 may have, store, and/or comprise BIOS memory 440-1, and application engine 440-2, and application database 440-3. The BIOS memory 440-1 may store BIOS instructions (e.g., BIOS instructions that, when executed by one or more processor(s) in the user communication device 102, cause the user communication device 102 to execute one or more operations described above with reference to the procedure 100. The application engine 440-2 and the application database 440-3 may be associated with one or more application installed on the user communication device 102.

A framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 100 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

Figure 5:
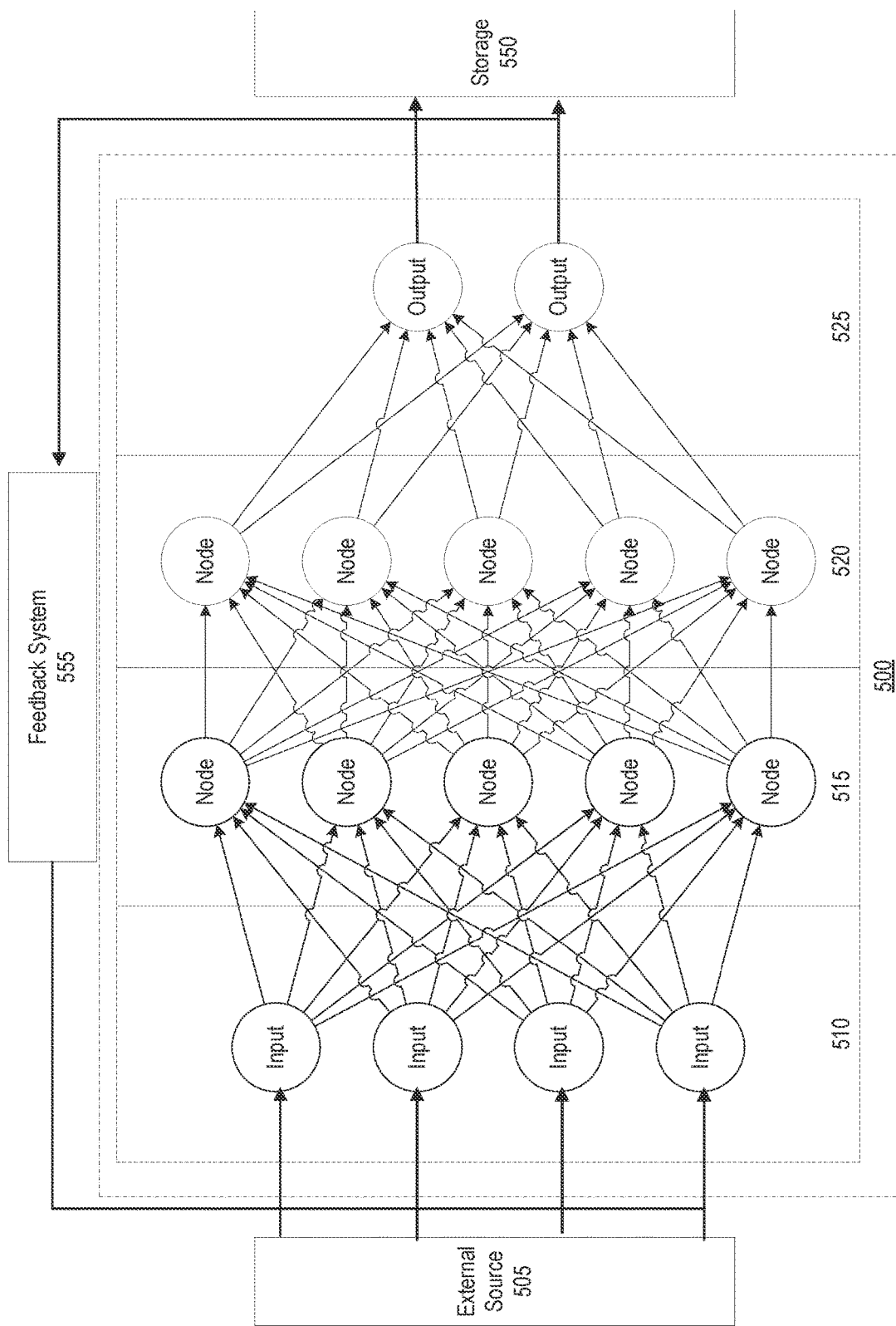
FIG. 5 illustrates a simplified example of an artificial neural network on which a machine learning algorithm may be executed, in accordance with one or more example embodiments.

By way of example, FIG. 5 illustrates a simplified example of an artificial neural network 500 on which a machine learning algorithm may be executed. The redirection router 104 may use the artificial neural network 500 to determine modulation values and/or confidence values. FIG. 5 is merely an example of nonlinear processing using an artificial neural network; other forms of nonlinear processing may be used to implement a machine learning algorithm in accordance with features described herein.

In FIG. 5, each of input nodes 510 is connected to a first set of processing nodes 515. Each of the first set of processing nodes 515 is connected to each of a second set of processing nodes 520. Each of the second set of processing nodes 520 is connected to each of output nodes 525. Though only two sets of processing nodes are shown, any number of processing nodes may be implemented. Similarly, though only four input nodes, five processing nodes, and two output nodes per set are shown in FIG. 5, any number of nodes may be implemented per set. Data flows in FIG. 5 are depicted from left to right: data may be input into an input node, may flow through one or more processing nodes, and may be output by an output node. Input into the input nodes 510 may originate from an external source 505. Then input from the input nodes may be, for example, the authorization keys 116, the location information, the indication of the application, signal strength of messages received from the user communication device 102, and/or the like. Output may be sent to a feedback system 555 and/or to storage 550. The feedback system 555 may send output to the input nodes 510 for successive processing iterations with the same or different input data.

In one illustrative method using feedback system 555, the system may use machine learning to determine an output. The output may include modulation values, confidence values, Boolean true or false value corresponding to whether the application is pre-associated, and/or the like. The system may use any machine learning model including xg-boosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 5 depicts nodes that may perform various types of processing, such as discrete computations, computer programs, and/or mathematical functions implemented by a computing device. For example, the input nodes 510 may comprise logical inputs of different data sources, such as one or more data servers. The processing nodes 515 may comprise parallel processes executing on multiple servers in a data center. And, the output nodes 525 may be the logical outputs that ultimately are stored in results data stores, such as the same or different data servers as for the input nodes 510. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 500 may learn and/or be dynamically reconfigured. Though nodes are depicted as having connections only to successive nodes in FIG. 5, connections may be formed between any nodes. For example, one processing node may be configured to send output to a previous processing node.

Input received in the input nodes 510 may be processed through processing nodes, such as the first set of processing nodes 515 and the second set of processing nodes 520. The processing may result in output in output nodes 525. As depicted by the connections from the first set of processing nodes 515 and the second set of processing nodes 520, processing may comprise multiple steps or sequences. For example, the first set of processing nodes 515 may be a rough data filter, whereas the second set of processing nodes 520 may be a more detailed data filter.

The artificial neural network 500 may be configured to effectuate decision-making. As a simplified example for the purposes of explanation, the artificial neural network 500 may be configured to detect faces in photographs. The input nodes 510 may be provided with a digital copy of a photograph. The first set of processing nodes 515 may be each configured to perform specific steps to remove non-facial content, such as large contiguous sections of the color red. The second set of processing nodes 520 may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 500 may then predict the location on the face. The prediction may be correct or incorrect.

The feedback system 555 may be configured to determine whether or not the artificial neural network 500 made a correct decision. Feedback may comprise an indication of a correct answer and/or an indication of an incorrect answer and/or a degree of correctness (e.g., a percentage). For example, in the facial recognition example provided above, the feedback system 555 may be configured to determine if the face was correctly identified and, if so, what percentage of the face was correctly identified. The feedback system 555 may already know a correct answer, such that the feedback system may train the artificial neural network 500 by indicating whether it made a correct decision. The feedback system 555 may comprise human input, such as an administrator telling the artificial neural network 500 whether it made a correct decision. The feedback system may provide feedback (e.g., an indication of whether the previous output was correct or incorrect) to the artificial neural network 500 via input nodes 510 or may transmit such information to one or more nodes. The feedback system 555 may additionally or alternatively be coupled to the storage 550 such that output is stored. The feedback system may not have correct answers at all, but instead base feedback on further processing: for example, the feedback system may comprise a system programmed to identify faces, such that the feedback allows the artificial neural network 500 to compare its results to that of a manually programmed system.

The artificial neural network 500 may be dynamically modified to learn and provide better input. Based on, for example, previous input and output and feedback from the feedback system 555, the artificial neural network 500 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 500, such that the artificial neural network 500 may vary its nodes and connections to test hypotheses.

The artificial neural network 500 need not have a set number of processing nodes or number of sets of processing nodes, but may increase or decrease its complexity. For example, the artificial neural network 500 may determine that one or more processing nodes are unnecessary or should be repurposed, and either discard or reconfigure the processing nodes on that basis. As another example, the artificial neural network 500 may determine that further processing of all or part of the input is required and add additional processing nodes and/or sets of processing nodes on that basis.

The feedback provided by the feedback system 555 may be mere reinforcement (e.g., providing an indication that output is correct or incorrect, awarding the machine learning algorithm a number of points, or the like) or may be specific (e.g., providing the correct output). For example, the machine learning algorithm 500 may be asked to detect faces in photographs. Based on an output, the feedback system 555 may indicate a score (e.g., 75% accuracy, an indication that the guess was accurate, or the like) or a specific response (e.g., specifically identifying where the face was located).

The artificial neural network 500 may be supported or replaced by other forms of machine learning. For example, one or more of the nodes of artificial neural network 500 may implement a decision tree, associational rule set, logic programming, regression model, cluster analysis mechanisms, Bayesian network, propositional formulae, generative models, and/or other algorithms or forms of decision-making. The artificial neural network 500 may effectuate deep learning.

Techniques described herein may enable an enterprise organization (e.g., a service provider, a corporate entity, a government agency, and/or the like) to provide seamless network connectivity to its consumers. A dedicated communication channel may be provided to a consumer, for example, to access and operate specific applications corresponding to the enterprise organization even when no other network (e.g., a cellular connection, a WLAN) is available. Automated connectivity provided by the communication protocol described herein may reduce user burden to manually provide authentication credentials. Access to the communication channel may be restricted only to the consumers and only for operation of the application thereby enabling a better quality of service.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An apparatus comprising:
   at least one processor; and
   a memory storing computer-readable instructions that, when executed by the at least one processor, cause the apparatus to:
   receive, from a user communication device, authorization keys, wherein the authorization keys are associated with a first application installed on the user communication device;
   determine, based on the authorization keys and location information corresponding to the apparatus, a modulation value associated with the authorization keys; and
   send, to the user communication device, an authentication indication based on the modulation value associated with the authorization keys, wherein the apparatus sends the authentication indication when the modulation value is above a threshold value.

2. The apparatus of claim 1, wherein the computer-readable instructions, when executed by the at least one processor, further cause the apparatus to: receive, from the user communication device, an application association request, wherein the application association request comprises an indication of the first application; and send, to the user communication device and based on the application association request, an association response message indicating that the user communication device is permitted to send, to the apparatus, messages associated with the first application.

3. The apparatus of claim 1, wherein the apparatus sends the authentication indication in a 2.4 GHz frequency band.

4. The apparatus of claim 1, wherein the computer-readable instructions, when executed by the at least one processor, further cause the apparatus to: receive, from a redirection router, data associated with the first application, wherein the redirection router blocks transmission of any data not associated with the first application.

5. The apparatus of claim 1, wherein the modulation value is further based on identification information of the first application.

6. The apparatus of claim 1, wherein the sending of the authentication indication occurs based on the modulation value associated with the authorization keys being above the threshold value greater than or equal to ninety percent.

7. The apparatus of claim 1, wherein the authorization keys comprise identification information corresponding to the first application.

8. A method comprising steps to:
   receive, from a user communication device, authorization keys, wherein the authorization keys are associated with a first application installed on the user communication device;
   determine, based on the authorization keys and location information corresponding to an apparatus, a modulation value associated with the authorization keys; and
   send, to the user communication device, an authentication indication based on the modulation value associated with the authorization keys, wherein the apparatus sends the authentication indication when the modulation value is above a threshold value.

9. The method of claim 8, comprising steps to: receive, from the user communication device, an application association request, wherein the application association request comprises an indication of the first application; and send, to the user communication device and based on the application association request, an association response message indicating that the user communication device is permitted to send, to the apparatus, messages associated with the first application.

10. The method of claim 8, comprising steps to: send, by the apparatus, the authentication indication in a 2.4 GHz frequency band.

11. The method of claim 8, comprising steps to: receive, from a redirection router, data associated with the first application, wherein the redirection router blocks transmission of any data not associated with the first application.

12. The method of claim 11, wherein the modulation value is further based on identification information of the first application.

13. The method of claim 8, wherein the sending of the authentication indication occurs based the modulation value associated with the authorization keys being above the threshold value greater than or equal to ninety percent.

14. The method of claim 8, wherein the authorization keys comprise identification information corresponding to the first application.

15. A non-transitory computer-readable medium storing computer executable instructions that, when executed by a computer processor, cause a computer system to:
- receive authorization keys, wherein the authorization keys are associated with a first application installed on a user communication device;
- determine, based on the authorization keys and location information corresponding to an apparatus, a modulation value associated with the authorization keys; and
- send, to the user communication device, an authentication indication based on the modulation value associated with the authorization keys, wherein the apparatus sends the authentication indication when the modulation value is above a threshold value.

16. The non-transitory computer-readable medium of claim 15, storing computer-executable instructions that, when executed by the computer processor, further cause the computer system to: receive, from the user communication device, an application association request, wherein the application association request comprises an indication of the first application; and send, to the user communication device and based on the application association request, an association response message indicating that the user communication device is permitted to send, messages associated with the first application.

17. The non-transitory computer-readable medium of claim 15, storing computer-executable instructions that, when executed by the computer processor, further cause the computer system to: receive, from a redirection router, data associated with the first application, wherein the redirection router blocks transmission of any data not associated with the first application.

18. The non-transitory computer-readable medium of claim 17, wherein the modulation value is further based on identification information of the first application.

19. The non-transitory computer-readable medium of claim 15, wherein the sending of the authentication indication occurs based on the modulation value associated with the authorization keys being above the threshold value greater than or equal to ninety percent.

20. The non-transitory computer-readable medium of claim 15, wherein the authorization keys comprise identification information corresponding to the first application.

* * * * *